(12) United States Patent
Chong

(10) Patent No.: US 6,775,726 B2
(45) Date of Patent: Aug. 10, 2004

(54) SERIAL UNIT IDENTIFICATION

(75) Inventor: Raymond L. Chong, San Jose, CA (US)

(73) Assignee: Sunrise Telecom Incorporated, San Jose, CA (US)

( * ) Notice: Subject to any disclaimer, the term of this patent is extended or adjusted under 35 U.S.C. 154(b) by 471 days.

(21) Appl. No.: 09/941,455

(22) Filed: Aug. 28, 2001

(65) Prior Publication Data

US 2003/0046476 A1 Mar. 6, 2003

(51) Int. Cl.[7] .......................... G06F 13/00; G01R 31/08
(52) U.S. Cl. ..................................... 710/104; 370/221
(58) Field of Search ............................. 710/9, 10, 104; 379/27.01, 27.03, 27.05, 29.01, 32.04; 370/221, 242, 245, 449, 475; 340/505, 506, 825.36; 307/116; 361/71, 90, 115

(56) References Cited

U.S. PATENT DOCUMENTS

| | | | | |
|---|---|---|---|---|
| 4,360,912 A | * | 11/1982 | Metz et al. | .................. 370/449 |
| 4,423,506 A | * | 12/1983 | Kawasaki et al. | .......... 370/221 |
| 4,864,519 A | * | 9/1989 | Appleby et al. | ............. 700/292 |
| 5,715,475 A | | 2/1998 | Munson et al. | |
| 5,801,913 A | * | 9/1998 | Pittel | ........................... 361/71 |
| 5,914,957 A | | 6/1999 | Dean et al. | |
| 6,105,077 A | * | 8/2000 | Kimura | ........................... 710/9 |
| 6,177,801 B1 | | 1/2001 | Chong | |
| 6,434,221 B1 | | 8/2002 | Chong | |
| 6,449,544 B1 | * | 9/2002 | Nitschke et al. | ............... 701/45 |
| 6,584,148 B1 | * | 6/2003 | Zitting et al. | ................ 375/222 |
| 6,600,723 B1 | * | 7/2003 | Reeb et al. | .................. 370/245 |

FOREIGN PATENT DOCUMENTS

| | | |
|---|---|---|
| EP | 1 113 676 A1 | 7/2001 |
| EP | 1 113 697 A2 | 7/2001 |
| WO | WO 01/045452 A3 | 12/2000 |

OTHER PUBLICATIONS

U.S. application Ser. No. 09/215,421, filed Dec. 18, 1998.

* cited by examiner

Primary Examiner—Khanh Dang
(74) Attorney, Agent, or Firm—Mikio Ishimaru

(57) ABSTRACT

A method and system are provided for determining the identity of computer peripheral devices that are coupled to a computer or network communication system in a daisy chain configuration. The computer includes a first switch. Each of the plurality of computer peripheral devices includes a bypass board having a second switch thereon. The method includes: (a) opening the first switch and the second switches; (b) closing the first switch; (c) detecting a short circuit formed between the computer and each one of the plurality of computer devices; and (d) identifying one of the peripheral computer devices which detects the short circuit as the first identified peripheral computer device. A method and system is also provided for sharing resources in a computer system, which includes a computer and peripheral computer devices.

23 Claims, 7 Drawing Sheets

SERIAL UNIT IDENTIFICATION

CROSS-REFERENCE TO RELATED APPLICATIONS

The present invention relates to, and incorporates by reference, 1) U.S. patent application Ser. No. 09/215,421, entitled "Telecommunications Transmission Test Set," filed on Dec. 18, 1998; and 2) U.S. patent application Ser. No. 09/295,857, now U.S. Pat. No. 6,177,801 B1, entitled "Detection of Bridge Tap Using Frequency Domain Analysis," filed on Apr. 21, 1999; and 3) U.S. application Ser. No. 09/574,696, now U.S. Pat. No. 6,434,221 B1, entitled "Digital Subscriber Line Access and Network Testing Multiplexer," filed on May 17, 2000.

TECHNICAL FIELD

The present invention relates generally to computer and computer peripheral equipment, and more specifically to telecommunication network equipment such as Digital Subscriber Line Access Multiplexers (DSLAMs).

BACKGROUND ART

The demand for access to digital communications networks, such as the Internet, is directly related to the speed or rate at which such networks can transfer data. Higher data transfer rates provide a foundation for increased communication efficiency and new types of communication applications or services. These, in turn, fuel demand for more widespread network access and still-higher data transfer rates.

Conventional analog modems currently provide a maximum data transfer rate of 56 kilobits per second (kbps). Other technologies, such as cable modem, can offer significantly improved performance, but typically require changes in a telecommunication network's underlying architecture. Such changes may necessitate large network infrastructure investments to meet user demand for network accessibility.

Digital Subscriber Line (DSL) technology provides increased communications bandwidth while using existing twisted-pair copper lines that are prevalent throughout much of the world. DSL delivers a basic data transfer rate of 128 kbps. High speed DSL, or HDSL, can deliver a data transfer rate of 1.544 megabits per second (Mbps) in North America, and 2.048 Mbps elsewhere. Asymmetric DSL, or ADSL, can deliver data rates ranging from 1.5 to 9.0 Mbps on a downstream or receiving path, and 16 to 800 kbps on an upstream or sending path. Taken together, varying DSL technologies are referred to as xDSL.

A conventional xDSL communication network organization includes a Main Distribution Frame (MDF), an access matrix, a DSL Access Multiplexer (DSLAM) and a test unit. The MDF is coupled to the access matrix, which itself is coupled to the DSLAM and the test unit. Each of the MDF, the access matrix, the test unit, and the DSLAM reside at an xDSL service provider's site. A set of Customer Premises Equipment (CPE) units is coupled to the MDF. Each CPE unit comprises an xDSL modem, and is located at a customer site.

The high-speed backbone is characterized by a data transfer rate much greater than that associated with any given CPE unit. Taken together, the DSLAM, the access matrix, and the MDF provide a signal exchange interface between the high-speed backbone and the CPE units. The DSLAM includes a set of xDSL modems and signal multiplexing circuitry, while the access matrix includes computer-controlled switching circuitry.

The organization of the conventional xDSL communication network as described above is undesirably space and cost inefficient. In many prior art configurations, the test unit is roughly comparable in size to the DSLAM itself.

A highly compact, cost efficient DSLAM capable of electrically characterizing subscriber loops is described in U.S. patent application Ser. No. 09/574,696, entitled "Digital Subscriber Line Access and Network Testing Multiplexer," filed on May 17, 2000. The improved DSLAM system incorporates built-in hardware and/or software for measuring and/or determining subscriber loop and/or DSL network electrical characteristics. The improved DSLAM (Digital Subscriber Line Access and Network Testing Multiplexer or DSLANTM) may include a set of line cards; a set of xDSL modem cards; a redundant xDSL modem cards; a testing and switching unit; at least one control unit; at least one trunk unit; and an interface unit into which each of the aforementioned elements couples. The testing and switching unit is coupled to the redundancy bus, and includes power interface circuitry, control logic, a switching relay matrix, a memory, and a Copper Loop Tester (CLT).

The CLT includes a subscriber loop test and measurement unit, and may include a processing unit, a Digital Signal Processor (DSP), a memory, and a set of test units.

In response to commands issued by the control unit, the CLT performs tests to measure and/or determine one or more subscriber loop electrical characteristics.

The problem with the CLT is that every DSLANTM has to have a CLT, which increases the cost of the networking system.

Even if a number of DSLANTMs are somehow coupled to share one CLT, there lacks a simple and inexpensive method and/or configuration to identify each individual DSLANTM for accurate communication with the network. What is needed is a new type of configuration that allows the sharing of a CLT with a number of DSLANTMs and provides simple and inexpensive identifications of individual DSLANTM.

DISCLOSURE OF THE INVENTION

The present invention provides a method and system for sharing resources in a system, which includes a computer and peripheral computer devices.

The present invention also provides a simple and inexpensive method to identify computer peripheral devices that are coupled to a computer or network communication system in a daisy chain configuration.

The present invention further provides a communication method and system which includes Digital Subscriber Line Access and Network Testing Multiplexer (DSLANTM) and co-located, peripheral DSLANTMs that share a single Copper Loop Tester provided with the DSLANTM, resulting in a highly space and cost efficient system.

The present invention still further provides a system that is adapted to facilitate the identification of computer peripheral devices. The system includes a computer with a communication port and a first switch; and a plurality of computer peripheral devices coupled to the computer in a daisy chain. The first switch has an open and a closed position. Each of the plurality of peripheral computer devices includes a bypass board having a sensor and a second switch thereon. Each of the second switches includes an open and a closed position. The plurality of peripheral computer devices is further coupled to the communication port of the computer. The computer is adapted to issue commands to the plurality of computer peripheral devices through the communication port. The second switch of each of the plurality of peripheral computer devices is adapted to connect to the daisy chain a succeeding one of the plurality of peripheral computer devices in the daisy chain when the second switch of the each of the plurality of peripheral computer devices is in the closed position, and to disconnect from the daisy chain the succeeding one of the plurality of peripheral computer devices in the daisy chain when the second switch of the each of the plurality of peripheral computer devices is in the open position. The sensor of each one of the plurality of peripheral computer devices is adapted to detect a short circuit when the first switch is in a closed position and the second switches of the plurality of peripheral computer devices preceding the each one of the plurality of peripheral computer devices in the daisy chain are in closed positions.

The present invention further provides a method for identifying each of a plurality of computer peripheral devices coupled to a computer in a daisy chain. The computer includes a first switch and each of the plurality of computer peripheral devices includes a second switch. The second switch of each of the plurality of peripheral computer devices is adapted to connect to the daisy chain a succeeding one of the plurality of peripheral computer devices in the daisy chain when the second switch of the each of the plurality of peripheral computer devices is in a closed position, and to disconnect from the daisy chain the succeeding one of the plurality of peripheral computer devices in the daisy chain when the second switch of the each of the plurality of peripheral computer devices is in an open position. The method includes the step of: (a) opening the first switch and the second switches; (b) closing the first switch; (c) detecting a short circuit formed between the computer and each one of the plurality of computer devices; and (d) identifying one of the peripheral computer devices which detects the short circuit as the first identified peripheral computer device.

The above and additional advantages of the present invention will become apparent to those skilled in the art from a reading of the following detailed description when taken in conjunction with the accompanying drawings.

BEST MODES FOR CARRYING OUT THE INVENTION

Figure 1:
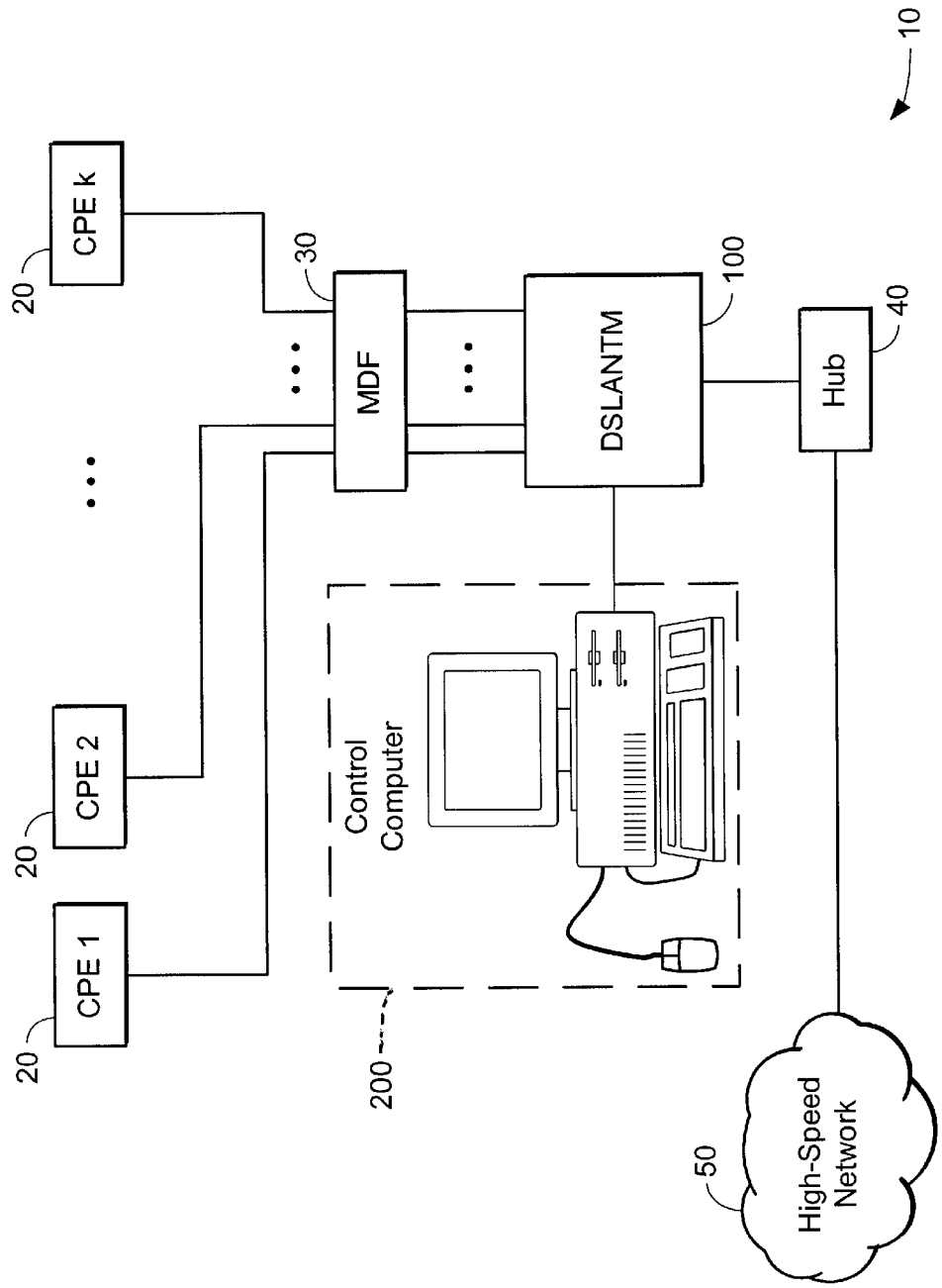
FIG. 1 is a block diagram of a Digital Subscriber Line communications network organization.

Referring now to FIG. 1, therein is shown a block diagram of a DSL communication network organization 10 which is essentially or generally analogous in structure and function to the network organization described in U.S. patent application Ser. No. 09/574,696, entitled "Digital Subscriber Line Access and Network Testing Multiplexer," filed on May 17, 2000.

The network organization 10 includes a Digital Subscriber Line Access and Network Testing Multiplexer (DSLANTM) 100 which is coupled to a Main Distribution Frame (MDF) 30, a gateway or hub 40, and a control computer 200. The MDF 30 is coupled to a set of Customer Premises Equipment (CPE) units 20, each of which includes an xDSL modem. The hub 40 is coupled via a conventional backbone line to a high-speed network 50, such as an Asynchronous Transfer Mode (ATM) segment of the Internet.

The control computer 200 may be conventional, typically including a workstation or server system having a processing unit; a data storage unit; an Input/Output (I/O) unit that facilitates user input via a keyboard and/or a mouse or other pointing device; a display device; and a network interface unit or communication port that facilitates signal exchange with the DSLANTM 100.

The DSLANTM 100 incorporates signal path selection circuitry as well as built-in hardware and software that can perform a wide variety of electrical tests upon DSL communication networks. By design, the signal path selection circuitry and the built-in electrical testing elements occupy little area, and hence the network organization 10 shown in FIG. 1 is space and cost efficient.

Figure 2:
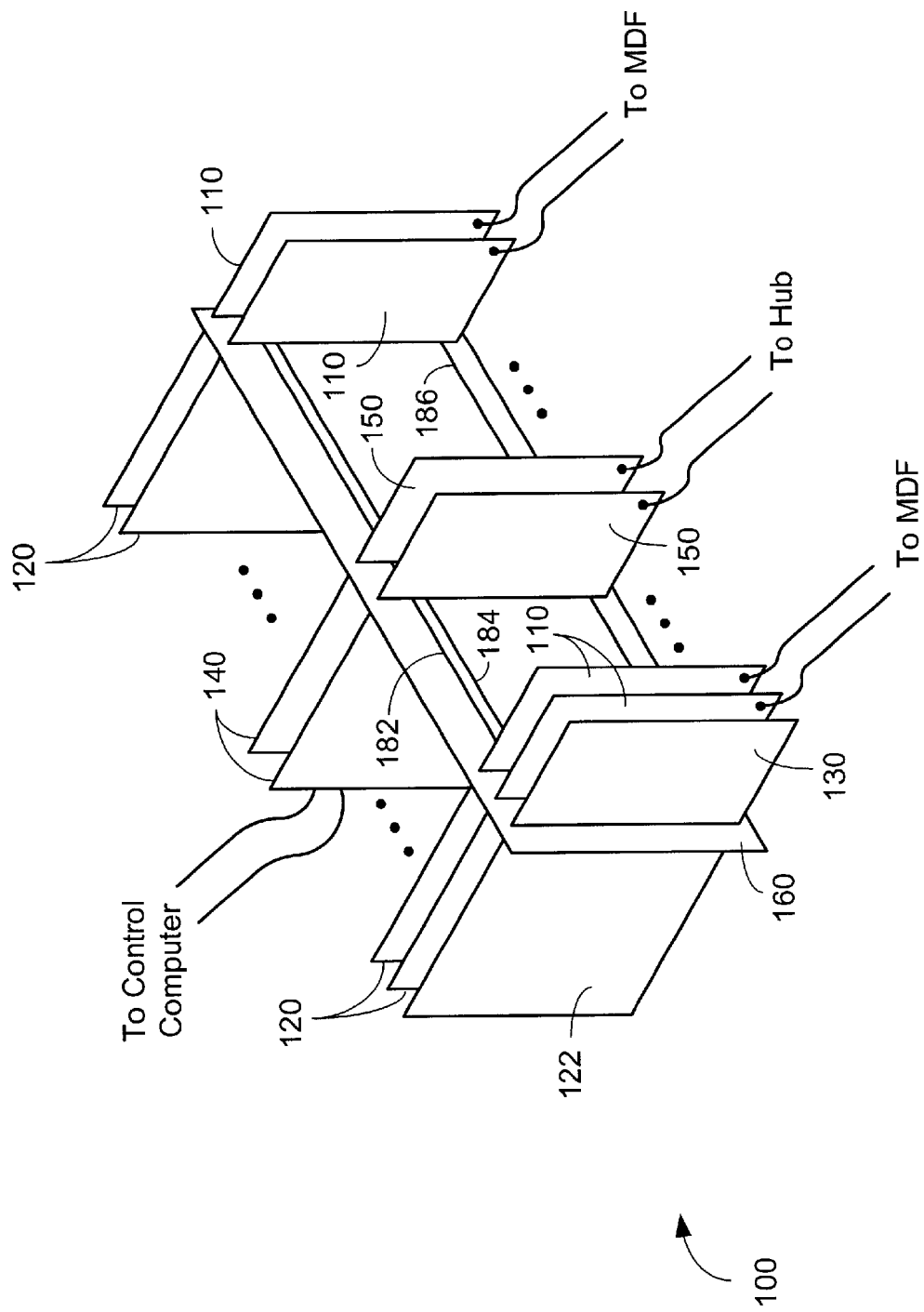
FIG. 2 is a perspective drawing of a Digital Subscriber Line Access and Network Testing Multiplexer (DSLANTM)

Referring now to FIG. 2, therein is shown a perspective drawing of the DSLANTM 100 which is essentially or generally analogous in structure and function to the DSLANTM described in U.S. patent application Ser. No. 09/574,696, entitled "Digital Subscriber Line Access and Network Testing Multiplexer," filed on May 17, 2000. The DSLANTM 100 includes a set of line cards 10; a set of xDSL modem cards 120, including a redundant xDSL modem card 122; a test and switching unit 130; at least one control unit 140; and at least one trunk unit 150. Each of the aforementioned elements is coupled to an interface module 160. Additionally, each of the line cards 110 is coupled to the MDF 30 and each of the trunk units 150 is coupled to the hub 40. Further, each control unit 140 is coupled to the control computer 200.

The interface module 160 includes circuit board or card that selectively facilitates signal exchange between the line cards 110, the xDSL modem cards 120 and 122, the test and switching unit 130, the control units 140, and the trunk units 150. The interface module 160 provides a set of signal pathways between each of the line cards 110 and the corresponding xDSL modem card 120 or the redundant xDSL modem card 122. The interface module 160 also provides a set of signal pathways between each control unit 140 and the line cards 110, the xDSL modem cards 120, 122, the test and switching unit 130, and the trunk units 150, thereby facilitating the selective exchange of control and communication signals between and/or among the control units 140 and each of the aforementioned elements. The interface module 160 may include a power bus 182, a control bus 184, and a redundancy bus 186.

The DSLANTM 100 may support xDSL modem cards 120 that operate in accordance with multiple types of DSL standards, such as ADSL, HDSL, HDSL/2, IDSL, SDSL, VDSL, and/or essentially any other xDSL standard.

Figure 3:
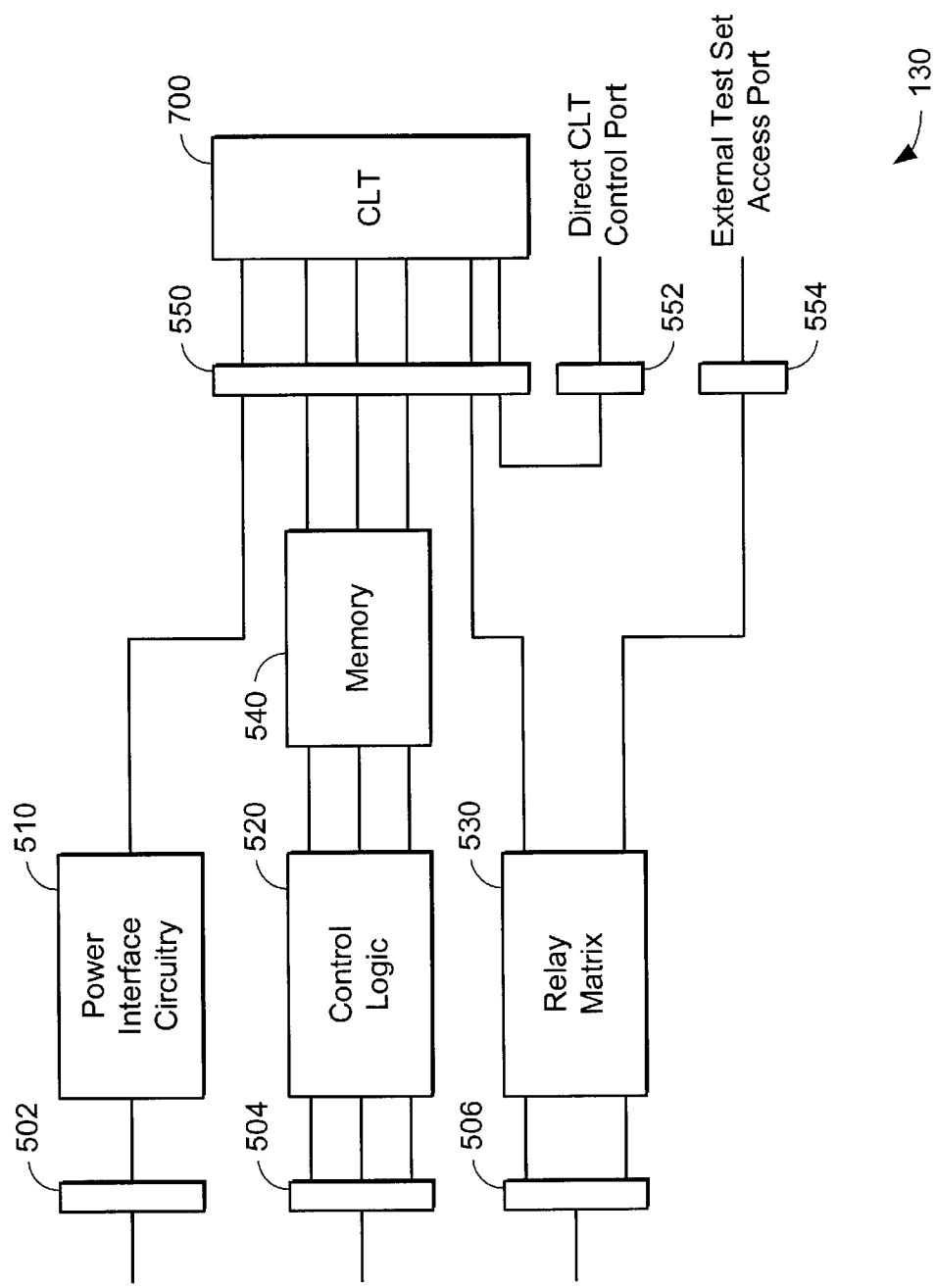
FIG. 3 is a block diagram of a test and switching unit.

Referring now to FIG. 3, therein is shown a block diagram of the test and switching unit 130 which is essentially or generally analogous in structure and function to the test and switching unit described in U.S. patent application Ser. No. 09/574,696, entitled "Digital Subscriber Line Access and Network Testing Multiplexer," filed on May 17, 2000.

The test and switching unit 130 includes power interface circuitry 510, control logic 520, a switching relay matrix 530, a memory 540, and a Copper Loop Tester (CLT) 700. The power interface circuitry 510 is coupled to the power bus 182 via a first connector 502. Similarly, the control logic 520 is coupled to the control bus 184 via a second connector 504, and the switching relay matrix 530 is coupled to the redundancy bus 186 via a third connector 506. A fourth connector 550 couples the CLT 700 to the power interface circuitry 510, the switching relay matrix 530, the memory 540, and a direct CLT control port 552. The direct CLT control port 552 may include, for example, a conventional serial port or other type of interface, and facilitates direct control of the CLT 700 via a device external to the DSLANTM 100. The switching relay matrix 530 is coupled to an external test set access port 554, which itself may include a conventional serial port or other type of interface. The external test set may be a set, such as that described in U.S. patent application Ser. No. 09/215,421, entitled "Telecommunications Transmission Test Set," to the DSLANTM 100. Finally, the memory 540 and the switching relay matrix 530 are coupled to the control logic 520.

The control logic 520 includes bus interface circuitry that receives control bus signals, and determines whether such signals are directed to or intended for the test and switching unit 130. Control bus signals directed to the test and switching unit 130 may include directives corresponding to switching relay matrix operation; or read/write commands directed to the memory 540.

The memory 540 provides a signal exchange interface between the control logic 520 and the CLT 700. The memory 540 stores electrical test commands and associated setup or initialization parameters received from the control unit 140. The memory 540 additionally stores electrical test and characterization results generated by the CLT 700, where the control unit 140 may retrieve such results as required. The memory 540 may include a conventional dual-port Random Access Memory (RAM), where each port may provide couplings corresponding to control, address, and data signals.

Figure 4:
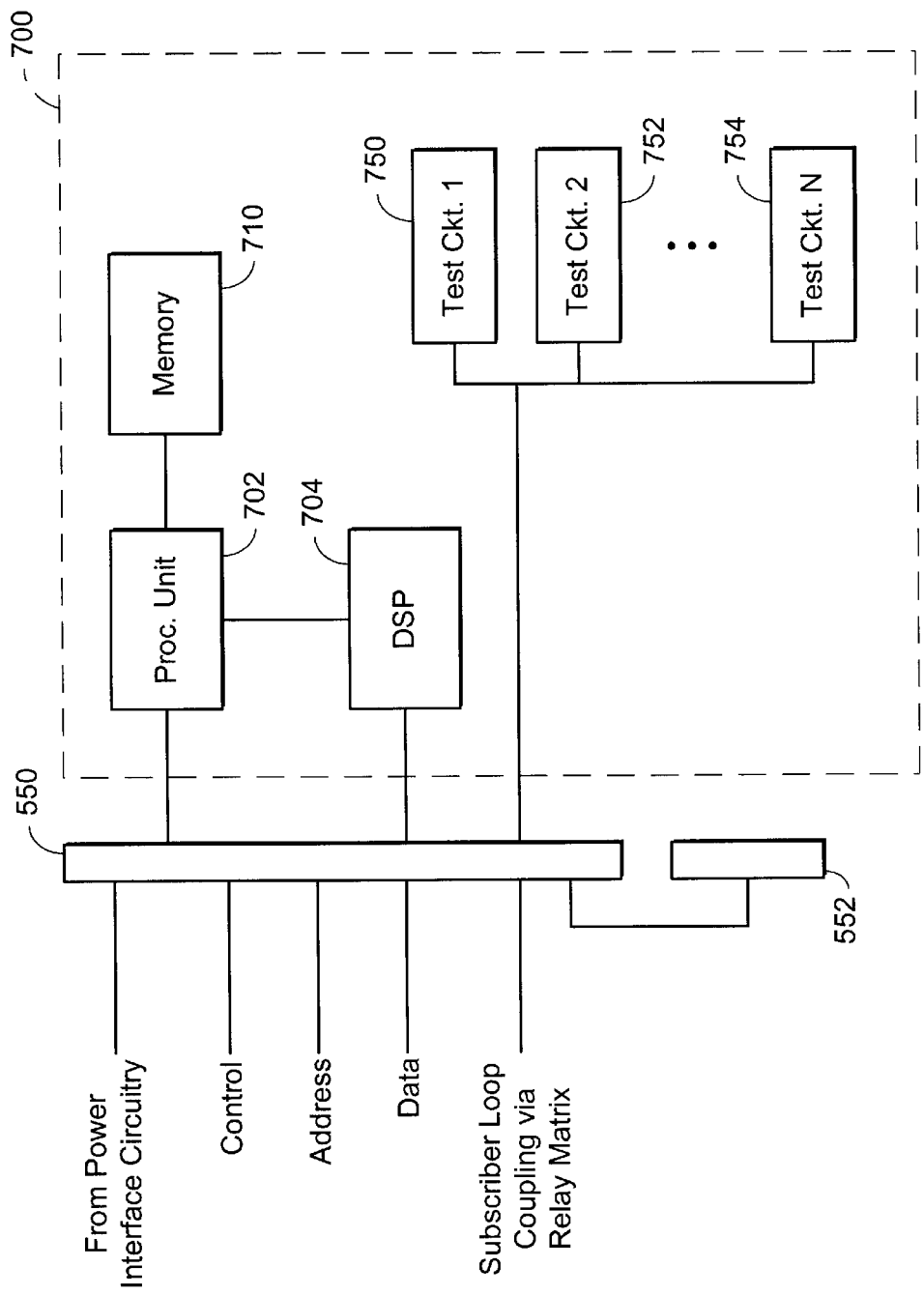
FIG. 4 is a block diagram of a Copper Loop Tester.

Referring now to FIG. 4, therein is shown a block diagram of the Copper Loop Tester (CLT) 700 which is essentially or generally analogous in structure and function to the CLT described in U.S. patent application Ser. No. 09/574,696, entitled "Digital Subscriber Line Access and Network Testing Multiplexer," filed on May 17, 2000.

The CLT 700 includes a processing unit 702, a Digital Signal Processor (DSP) 704, a CLT memory 710, and a set of test circuits 750, 752, 754. The processing unit 702 and the DSP 704 are coupled to the fourth connector 550, and may thereby access the memory 540 of the test and switching unit as well as the direct CLT control port 552. The direct CLT control port 552 may therefore enable the processing unit 702 and/or the DSP 704 directly or essentially directly communicate with a device or controller external to the DSLANTM 100. The CLT memory 710 is coupled to the processing unit 702. Each test circuit 750, 752, and 754 is coupled to the fourth connector 550, which provides an interface for coupling each test circuit 750, 752, and 754 to the redundancy bus 186 via a second switch (not shown) within the switching relay matrix 530. In other word, each test circuit 750, 752, and 754 may be coupled to a subscriber loop selected via the switching relay matrix 530.

The control unit 140 may control, direct, or manage the operation of the CLT 700 by issuing commands to the test and switching unit 130. The CLT 700 may also or alternatively be controlled by signals received via the direct CLT control port 552.

The method for performing local loop testing using DSLANTM 100 is essentially analogous to the method of operation described in U.S. patent application Ser. No. 09/574,696, entitled "Digital Subscriber Line Access and Network Testing Multiplexer," filed on May 17, 2000, and will not be repeated here.

Figure 5:
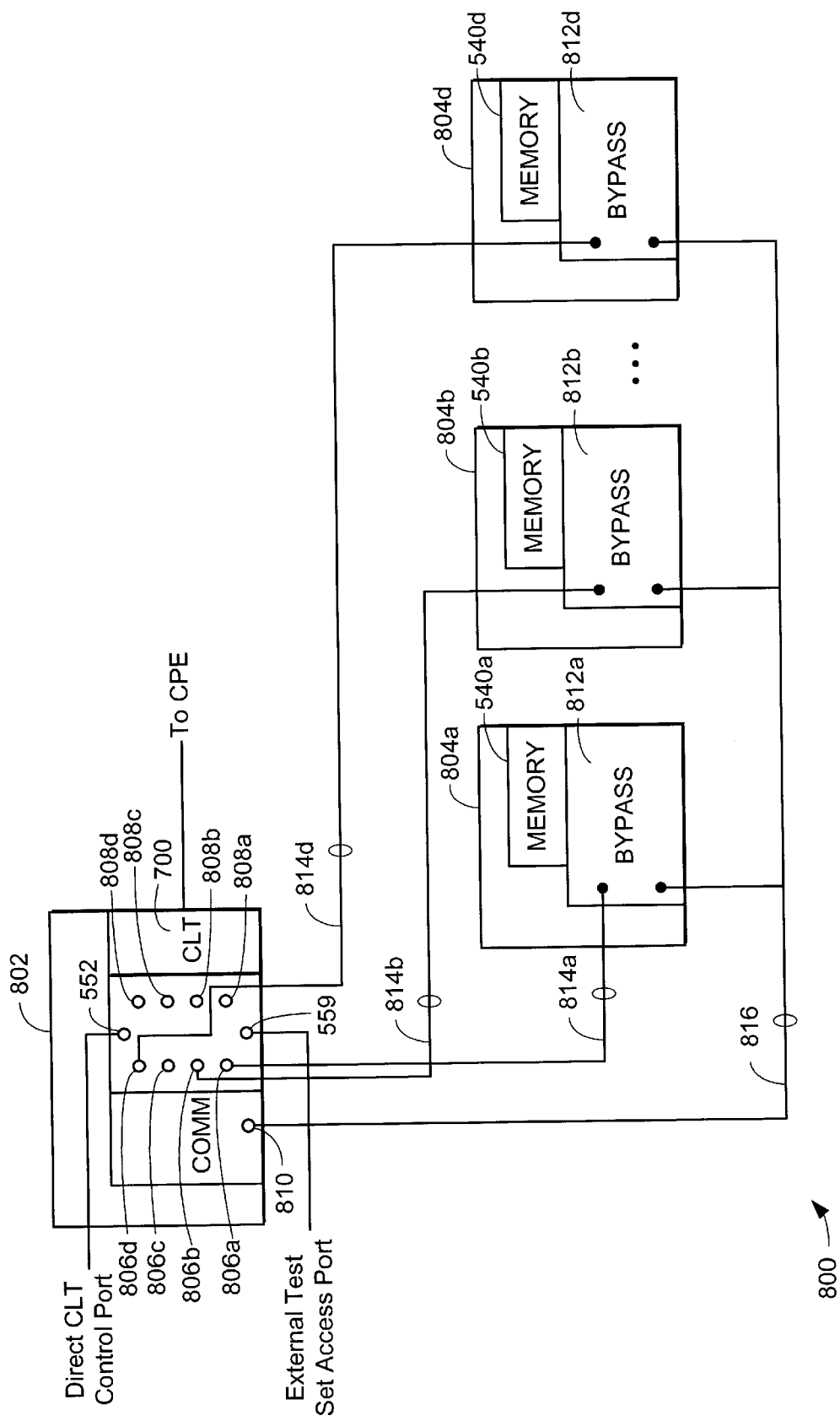
FIG. 5 is a block diagram of a DSLANTM and a number of peripheral DSLANTMs constructed in accordance with the present invention.

Referring now to FIG. 5, therein is shown a block diagram of a communication system 800 constructed according to the present invention in which one CLT supports a number of co-located, peripheral DSLANTMs.

The system 800 includes a DSLANTM 802, and peripheral DSLANTMs 804a through 804d. The DSLANTM 802 includes the CLT 700, the direct CLT control port 552, the external test set access port 554, inter-DSLANTM connection ports 806a through 806d, and 808a through 808d, and a communication port 810. The DSLANTM 804a includes a memory 540a and a bypass board 812a. Similarly, the DSLANTM 804b includes a memory 540b and a bypass board 812b. In one embodiment, the memory 540a through 540d each includes a conventional dual-port Random Access Memory (RAM). In this embodiment, the peripheral DSLANTMs 804a through 804d are connected in a parallel configuration with respect to the DSLANTM 802.

The CLT 700 is coupled to a number of Customer Premises Equipment (CPE) through an access matrix (not shown). It should be noted that the access matrix may be incorporated into the DSLANTM 802. The inter-DSLANTM port 806a is coupled to the bypass board 812a on cable 814a. In one embodiment, cable 814a includes three wires and each of the wires is used to carry one signal. The three signals are: tip, ring and signal ground. Similarly, the inter-DSLANTM port 806b is coupled to the bypass board 812b via cable 814b. Also, the inter-DSLANTM port 808a is coupled to the bypass board 812a on a cable (not shown). The inter-DSLANTM ports 806a through 806d are the direct CLT control (or test) ports for DSLANTMs 812a through 812d, respectively. The inter-DSLANTM ports 808a through 808d are the external test set access ports for DSLANTMs 812a through 812d, respectively.

The communication port 810 of the DSLANTM 802 is coupled to each of the bypass boards 812a through 812d via a cable 816. In one embodiment, the cable 816 includes five wires, each of the wires is used to carry one signal. The five signals are: Tx+, Tx−, Rx+, Rx− and Busy. The communication port 810 may be a RS845 master/slave communication port.

For the purposes of discussion, it is assumed that DSLANTM 804a requires the use of the CLT 700. The operation of the system 800 begins with the DSLANTM 804a pulling the Busy signal of the communication port 810 to low. Next, the bypass board 812a receives a Command from the memory 540a. The bypass board 812a converts the Command to a common protocol and sends it to the CLT 700 via the cable 814a. The CLT 700 then performs the on board CLT testing at the inter-DSLANTM port 806a without going through the access matrix (not shown).

Accordingly, when the DSLANTM 804a requires the use of the CLT 700, the bypass board 812a will request the CLT 700 to perform the testing needed and then return the result to the peripheral DSLANTM 804a via the bypass board 812a.

Therefore, in accordance with the present invention, a communication system with the DSLANTM and the co-located peripheral DSLANTMs can share a CLT provided with the DSLANTM, resulting in a highly space and cost efficient system.

To determine the identities of the peripheral DSLANTMs 804a through 804d, the DSLANTM 802 would randomly assign a unique identity or address to each of the peripheral DSLANTMs 804a through 804d.

It should be noted that a total of 29 wires (8 inter-DSLANTM ports*3/port+5 for the connections between the communication port 810 and the bypass boards 812a through 812d) is required to facilitate communication between the DSLANTMs 802 and 804a through 804d.

Figure 6:
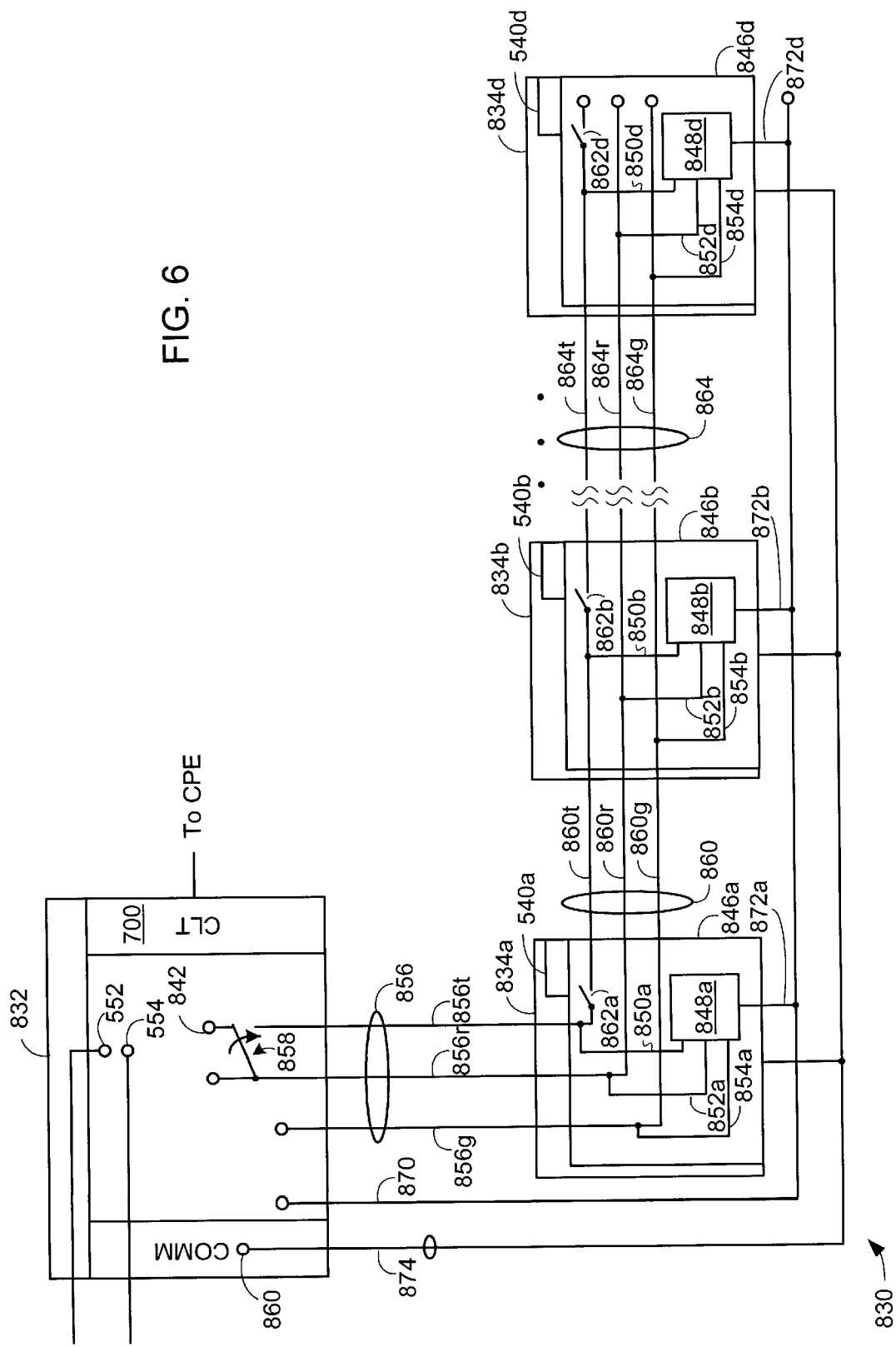
FIG. 6 a block diagram of a DSLANTM and a number of peripheral DSLANTMs coupled in a daisy chain constructed in accordance with the present invention.

Referring now to FIG. 6, therein is shown a block diagram of a communication system 830 constructed according to the present invention in which one CLT supports a number of co-located, peripheral DSLANTMs.

The system 830 includes a DSLANTM 832, and peripheral DSLANTMs 834a through 834d. The DSLANTM 832 includes the CLT 700, the direct CLT control port 552, the external test set access port 554, and a communication port 860.

The DSLANTM 834a includes a memory 540a and the bypass board 846a. Similarly, the DSLANTM 834b includes a memory 540b and a bypass board 846b. In one embodiment, the memories 540a through 540d each includes a conventional dual-port Random Access Memory (RAM). In this embodiment, the peripheral DSLANTMs 834a through 834d are connected in a serial or daisy chain configuration with respect to the DSLANTM 832.

The CLT 700 is coupled to the Customer Premises Equipment (CPE) of a number of different customers through an access matrix (not shown). Again, it should be noted that the access matrix may be incorporated into the DSLANTM 832.

The bypass board 846a includes a sensor 848a. The peripheral DSLANTM 834a is connected to the DSLANTM 832 by a cable 856. The cable 856 includes three wires 856t, 856r and 856g for carrying a tip signal, a ring signal, and a signal ground, respectively. The sensor 848a is connected to three wires: 850a, 852a, and 854a. Each of the wires 850a, 852a, and 854a is connected to the wires 856t, 856r and 856g, respectively. The DSLANTM 832 includes a switch 858 which is connected to the wire 856r. When the switch 858 is opened, the wire 856r will be connected to a connection 842. When the switch is closed, the wire 856r is connected to the wire 856t.

Similarly, the bypass board 846b includes a sensor 848b. The peripheral DSLANTM 834b is connected to the peripheral DSLANTM 834a by a cable 860. The cable 860 includes three wires 860t, 860r and 860g for carrying the tip signal, the ring signal, and the signal ground, respectively. The sensor 848b is connected to three wires: 850b, 852b, and 854b. Each of the wires 850b, 852b, and 854b is connected to the wires 860t, 860r and 860g, respectively. The bypass board 846a further includes a switch 862a. When the switch 862a is closed (short circuit), the wire 860t is connected to the wire 856t. When the switch 862a is opened, the wire 860t is disconnected from the wire 856t. Therefore, when the switch 862a is opened, succeeding DSLANTMs, such as 834b through 834d, are disconnected from the daisy chain.

Similarly, the bypass board 846d includes a sensor 848d. The peripheral DSLANTM 834d is connected to the peripheral DSLANTM 834b by a cable 864. The cable 864 includes three wires 864t, 864r and 864g for carrying tip, ring, and signal ground, respectively. The sensor 848d is connected to three wires: 850d, 852d, and 854d. Each of the wires 850d, 852d, and 854d is connected to the wires 862t, 862r and 862g, respectively. The bypass board 846b further includes a switch 862b. When the switch 862b is closed, the wire 864t is connected to the wire 860t. When the switch is opened, the wire 864t is disconnected from the wire 860t. When the switch 862b is opened, succeeding DSLANTMs from DSLANTM 834b are disconnected from the daisy chain The sensor 848a is adapted to sense for a short circuit (or continuity) in a first loop which is formed by wire 850a, wire 856t, switch 858, and wire 852a. The sensor 848b is adapted to sense for a short circuit in a second loop, which is formed by wire 850b, wire 860t, switch 862a, wire 856t, switch 858, wire 860r, and wire 852b. The sensor 848d is adapted to sense for a short circuit in a third loop which is formed by wire 850d, wire 864t, switch 862b, wire 860t, switch 862a, wire 856t, switch 858, wire 856r, wire 860r, wire 864r, and wire 852d.

A wire 870 is connected by a wire 872a to the sensor 848a in the peripheral DSLANTM 834a. The wire 870 is also connected by a wire 872b to the sensor 848b in the peripheral DSLANTM 834b. The wire 870 is further connected by a wire 872d to the sensor 848d in the peripheral DSLANTM 834d on wire.

The communication port 860 of the DSLANTM 832 is coupled to each of the bypass boards 846a through 846d by a cable 874. In one embodiment, the cable 874 includes five wires and each of the wires is used to carry one signal. The five signals are: Tx+, Tx−, Rx+, Rx− and Busy. The communication port 860 may be a RS845 master/slave communication port.

For the purposes of discussion, it is assumed that the peripheral DSLANTM 834a requires the use of the CLT 700. The operation of the system 830 begins with the DSLANTM 834a pulling the Busy signal of the communication port 860 to low. Next, the bypass board 846a receives a Command from the memory 540a. The bypass board 846a converts the Command to a common protocol and sends it to the CLT 700 via the cable 856. The CLT 700 tests the proper tip, ring, and signal ground set. Thereafter, the CLT 700 performs the on board CLT testing without going through an access matrix (not shown).

Accordingly, when the peripheral DSLANTM 834a requires the use of the CLT 700, the bypass board 846a will request the CLT 700 to perform the testing needed and then return the result to DSLANTM 834a via the cable 856 and the bypass board 846a.

Therefore, in accordance with the present invention, a communication system with DSLANTM and co-located, peripheral DSLANTMs can share a CLT provided with the DSLANTM, resulting in a highly space and cost efficient system.

It should be noted that only a total of 9 wires: 3 wires for each of the cables 856, 860, or 864, 5 wires for the cable 874, and 1 wire for the wire 870). The reduction in the number of wires as compare to the system 800 advantageously results in further reduction in size and cost for the system 850.

The present invention also provides a simple and inexpensive method to determine the identity of computer peripheral devices that are coupled to a computer or network communication system in a daisy chain configuration.

Figure 7:
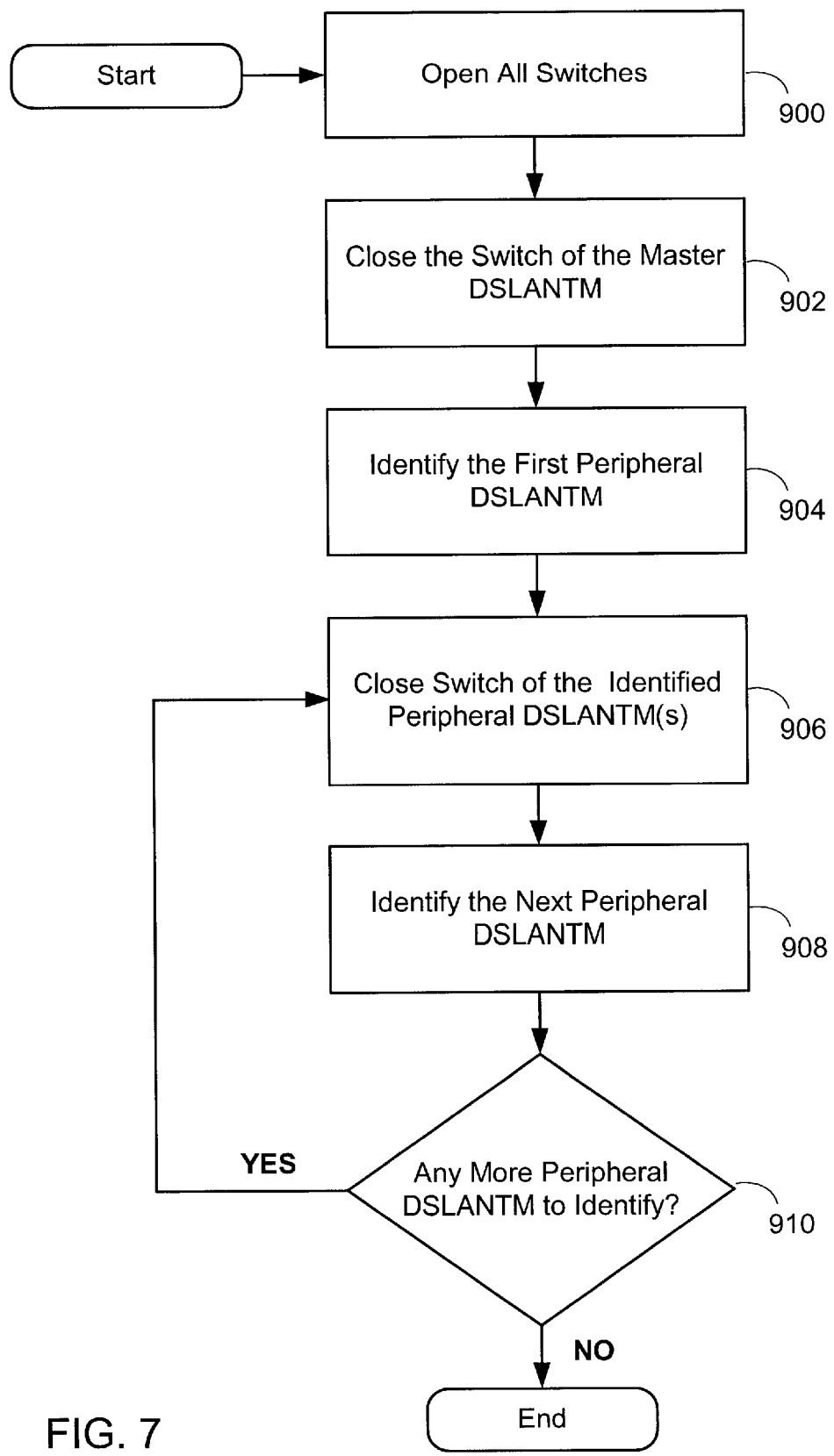
FIG. 7 a flow diagram of a method of identifying peripheral DSLANTMs coupled in a daisy chain with a DSLANTM constructed in accordance with the present invention.

Referring now to FIG. 7, therein is shown a flowchart of a method for determining the identities of the peripheral DSLANTMs (834a through 834d, as shown in FIG. 6) in accordance with the present invention.

In one embodiment, the method begins in step 900 with the DSLANTM (also referred to as the Master DSLANTM) 832 issuing a command to open all switches, which includes switches 858, and 862a through 862d.

In a second step 902, the DSLANTM 832 issues a command to close the switch of the master DSLANTM or switch 858.

In a third step 904, a DSLANTM identifies itself as a first peripheral DSLANTM by being the first peripheral DSLANTM whose sensor detects a short circuit. For example, when the switch 858 is closed, the sensor 848a will detect a short circuit in a first loop, which is formed by wire 850a, wire 856t, switch 858, wire 856r, and wire 852a. Therefore, peripheral DSLANTM 834a identifies itself as the first peripheral DSLANTM.

In a fourth step 906, with the switch 858 remaining closed, the DSLANTM 832 issues a command to the first peripheral DSLANTM to close its internal switch, e.g., to the peripheral DSLANTM 834a to close the switch 862a.

In a fifth step 908, the next DSLANTM identifies itself as the next peripheral DSLANTM. The peripheral DSLANTM whose sensor next detects a short circuit will be the second peripheral DSLANTM. For example, when the switches 858 and 862a are closed, the sensor 848b will detect a short circuit in a second loop, which is formed by wire 850b, wire 860t, switch 862a, wire 856t, switch 858, wire 856r, wire 860r, and wire 852b. Therefore, peripheral DSLANTM 834b identifies itself to be the second peripheral DSLANTM.

In a sixth step 910, the DSLANTM 832 determines if there are any more peripheral DSLANTM to be identified. If so, the method returns to step 906. Otherwise, the method ends.

Accordingly, the present invention provides a method for simple and inexpensive identification of peripheral devices coupled to a master device in a daisy chain configuration.

As evident, in an alternate embodiment, the close switch signal is sent out at timed intervals by the DSLANTM 832 and the peripheral DSLANTMs 834a–834d has logic circuitry for performing a number of function including assigning unique identifiers to themselves and holding the unique identifiers in the memories 540a–540d for later use.

Similarly, in another alternate embodiment, the sensors 848a–848d use the respective wires 872a–872d through their connection to wire 870 to provide positive information to the DSLANTM 832 regarding the peripheral DSLANTMs 834a–834d in the event that a switch 862a–862d fails to open or close properly in previous DSLANTMs.

While the best mode uses DSLANTM to identify peripheral DSLANTMs, the present invention is applicable to the identification by a host computer system, such as a personal computer, of any serially connected peripheral devices, such as computer peripheral devices (monitors, printers, scanners, keyboards, mice, joysticks, speakers, microphones, etc.).

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A system comprising:
a computer having a first switch, the first switch having an open and a closed position, the computer is a Digital Subscriber Line Access and Network Testing Multiplexer (DSLANTM) and the plurality of computer peripheral devices are peripheral DSLANTMs; and
a plurality of computer peripheral devices coupled to the computer in a daisy chain for receiving commands therefrom, each of the plurality of peripheral computer devices including a sensor and a second switch therein, the second switch having an open and a closed position, the second switch of each of the plurality of peripheral computer devices adapted to connect to the daisy chain a succeeding one of the plurality of peripheral computer devices in the daisy chain when the second switch of the each of the plurality of peripheral computer devices is in the closed position, and to disconnect from the daisy chain the succeeding one of the plurality of peripheral computer devices in the daisy chain when the second switch of the each of the plurality of peripheral computer devices is in the open position;
wherein:
the sensor of each one of the plurality of peripheral computer devices is adapted to detect a short circuit, when the first switch is in the closed position and the second switches of the plurality of peripheral computer devices preceding the each one of the plurality of peripheral computer devices in the daisy chain are in the closed positions.

2. The system as claimed in claim 1 wherein the computer is adapted to issue commands to open the first switch and all the second switches, close the first switch, and sequentially close the second switches.

3. The system as claimed in claim 1 wherein each of the plurality of computer peripheral devices is coupled to the computer to indicate if a first of the computer peripheral devices has the first switch in the open or closed position or if a second of the computer peripheral devices has the second switch in the open or closed position.

4. The system as claimed in claim 1 wherein the computer is a personal computer and the plurality of computer peripheral devices are selected from the group of peripheral computer devices consisting of monitors, printers scanners, keyboards, mice, joysticks, speakers, and microphones.

5. The system as claimed in claim 1 wherein the DSLANTM includes a Copper Loop Tester for performing loop testing.

6. The system as claimed in claim 1 wherein at least one of the peripheral DSLANTMs does not include a Copper Loop Tester for performing loop testing.

7. A system comprising:
a computer, the computer having and a first switch; the first switch having an open and a closed position, the computer is a Digital Subscriber Line Access and Network Testing Multiplexer (DSLANTM) and the plurality of computer peripheral devices are peripheral DSLANTMs; and
a plurality of computer peripheral devices coupled to the computer in a daisy chain, the plurality of computer peripheral devices coupled to the communication port of the computer for receiving commands from the computer, each of the plurality of peripheral computer devices including a bypass board having a sensor and a second switch thereon, the second switch having an open and a closed position, the second switch of each of the plurality of peripheral computer devices adapted to connect to the daisy chain a succeeding one of the plurality of peripheral computer devices in the daisy chain when the second switch of the each of the plurality of peripheral computer devices is in the closed position, and to disconnect from the daisy chain the succeeding one of the plurality of peripheral computer devices in the daisy chain when the second switch of the each of the plurality of peripheral computer devices is in the open position; wherein:

the plurality of computer peripheral devices is responsive to commands from the computer, the first switch is adapted to be in the open and closed positions in response to commands from the computer; and each of the second switches is adapted to be in the open and closed positions in response to commands from the computer, and the sensor of each one of the plurality of peripheral computer devices is adapted to detect a short circuit when the first switch is in a closed position and the second switches of the plurality of peripheral computer devices preceding the each one of the plurality of peripheral computer devices in the daisy chain are in closed positions.

8. The system as claimed in claim 7 including circuitry for the computer to identify each of the plurality of peripheral devices.

9. The system as claimed in claim 7 including circuitry for the computer to identify failures of the first switch and the second switches to open or close.

10. The system as claimed in claim 7 wherein the computer is a personal computer and the plurality of computer peripheral devices are selected from the group consisting of monitors, printers, scanners, keyboards, mice, joysticks, speakers, and microphones.

11. The system as claimed in claim 7 wherein the DSLANTM includes a Copper Loop Tester for performing loop testing.

12. The system as claimed in claim 11 wherein at least one of the peripheral DSLANTMs does not include a Copper Loop Tester for performing loop testing.

13. A serial identification unit for a computer system capable of outputting signals comprising:

a Digital Subscriber Line Access and Network Testing Multiplexer (DSLANTM) as a computer in the computer system;

peripheral DSLANTMs as a plurality of peripheral computer devices in the computer system;

a serial identification unit in each of the peripheral computer devices including:

an input connected to the DSANTAM or one of the peripheral DSLANTMs, an output connected to the DSANTAM or one of the peripheral DSLANTMs, a sensor connected to the input for detecting short circuits on the input and providing a sensor signal in response thereto, circuitry connected to the sensor for providing an identification in response to the sensor signal, and a switch connected to the circuitry for connecting and disconnecting the input to and from the output in response to signals from the DSLANTM.

14. The serial identification unit as claimed in claim 13 wherein a plurality of serial identification units are daisy chained to the computer system.

15. The serial identification unit as claimed in claim 14 wherein the plurality of serial identification units receives the signal and the serial identification unit can be uniquely identified.

16. In a system comprising a computer and a plurality of computer peripheral devices, the computer and the plurality of computer peripheral devices coupled in a daisy chain, the computer having a first switch, each of the plurality of computer peripheral devices includes a second switch, the second switch of each of the plurality of peripheral computer devices adapted to connect to the daisy chain a succeeding one of the plurality of peripheral computer devices in the daisy chain when the second switch of the each of the plurality of peripheral computer devices is in a closed position, and to disconnect from the daisy chain the succeeding one of the plurality of peripheral computer devices in the daisy chain when the second switch of the each of the plurality of peripheral computer devices is in an open position, a method for identifying each of the plurality of computer peripheral devices comprising:

opening the second switches;

closing the first switch;

detecting a short circuit formed between the computer and each one of the plurality of computer devices;

identifying one of the peripheral computer devices which detects the short circuit as the first identified peripheral computer device; and the opening, closing, detecting, and identifying are controlled by the computer and the computer is a Digital Subscriber Line Access and Network Testing Multiplexer (DSLANTM), and the computer peripheral devices are peripheral DSLANTMs.

17. The method as claimed in claim 16 further comprising:

closing the second switch of the first identified peripheral computer device;

detecting a second short circuit formed between the computer and each one of the plurality of computer devices; and identifying another one of the peripheral computer devices which detects the second short circuit as the next identified peripheral computer device.

18. The method as claimed in claim 16 wherein the opening, closing, detecting, and identifying are performed in response to commands issued by the computer to each of the plurality of computer peripheral devices through a communication port.

19. The method as claimed in claim 16 wherein the opening, closing, detecting, and identifying are controlled by the computer and the computer is a personal computer, and the computer peripheral devices are selected from the group consisting of monitors, printers, scanners, keyboards, mice, joysticks, speakers, and microphones.

20. The method as claimed in claim 16 wherein the DSLANTM includes a Copper Loop Tester for performing loop testing.

21. The method as claimed in claim 20 wherein at least one of the peripheral DSLANTMs does not include a Copper Loop Tester for performing loop testing.

22. In a system comprising a computer and a plurality of computer peripheral devices, the computer and the plurality of computer peripheral devices coupled in a daisy chain, the computer having a first switch, each of the plurality of computer peripheral devices includes a second switch, the second switch of each of the plurality of peripheral computer devices adapted to connect to the daisy chain a succeeding one of the plurality of peripheral computer devices in the daisy chain when the second switch of the each of the plurality of peripheral computer devices is in a closed position, and to disconnect from the daisychain the succeeding one of the plurality of peripheral computer devices in the daisy chain when the second switch of the each of the plurality of peripheral computer devices is in an open position, a method for identifying each of the plurality of computer peripheral devices comprising:

opening the second switches;

closing the first switch;

detecting a short circuit forming between the computer and each one of the plurality of computer devices;

identifying one of the peripheral computer devices which detects the short circuit as the first identified peripheral computer device;

closing the second switch of the first identified peripheral computer device;

detecting a second short circuit formed between the computer and each one of the plurality of computer devices;

identifying another one of the peripheral computer devices which detects the second short circuit as the next identified peripheral computer device;

the opening, closing, detecting, and identifying are controlled by the computer and the computer is a Digital Subscriber Line Access and Network Testing Multiplexer (DSLANTM), and the plurality of computer peripheral devices are peripheral DSLANTMs.

23. The method as claimed in claim 22 wherein the opening, closing, detecting, and identifying are controlled by the computer and the computer is a personal computer, and the computer peripheral devices are selected from the group consisting of monitors, printers, scanners, keyboards, mice, joysticks, speakers, and microphones.

* * * * *